Sept. 15, 1925.                                                 1,554,081
                           B. A. GARRETT
                         SELF OILING GEARING
                        Filed March 23, 1923
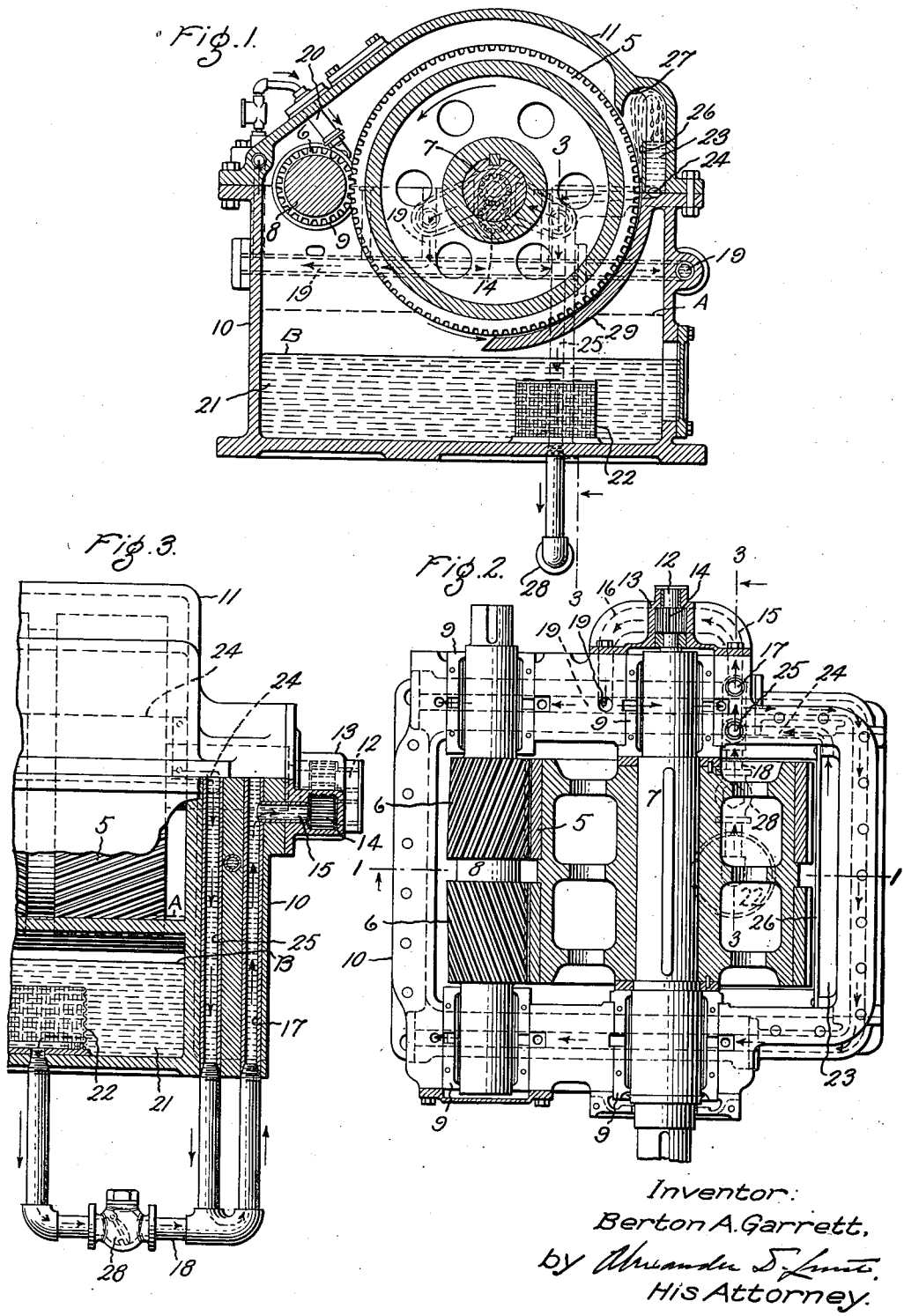
Inventor:
Berton A. Garrett,
by
His Attorney.

Patented Sept. 15, 1925.

1,554,081

UNITED STATES PATENT OFFICE.

BERTON A. GARRETT, OF SCHENECTADY, NEW YORK, ASSIGNOR TO GENERAL ELECTRIC COMPANY, A CORPORATION OF NEW YORK.

SELF-OILING GEARING.

Application filed March 23, 1923. Serial No. 627,136.

*To all whom it may concern:*

Be it known that I, BERTON A. GARRETT, a citizen of the United States, residing at Schenectady, county of Schenectady, State of New York, have invented certain new and useful Improvements in Self-Oiling Gearing, of which the following is a specification.

The present invention relates to gearing in which the gear teeth and bearings are lubricated by a pump driven from one of the gear wheel shafts and has for its object to provide an improved lubricating system wherein the pump is self-priming, thereby providing a gearing which is entirely self-oiling.

For a consideration of what I believe to be novel and my invention, attention is directed to the accompanying description and the claims appended thereto.

In the drawing, Fig. 1 is a transverse, sectional view of a gearing embodying my invention, the section being taken on line 1—1, Fig. 2; Fig. 2 is a plan view with the upper half of the casing removed, and Fig. 3 is a side elevation partly in irregular section, the section being taken partly on line 3—3, Figs. 1 and 2, and through the lubricant pump.

Referring to the drawing, 5 indicates a gear wheel and 6 a pinion meshing therewith, the same being carried by shafts 7 and 8 supported in suitable bearings 9 in the gear casing. The gear casing is split horizontally in line with the centers of the bearings to form a base 10 and a cover 11 between which the bearing linings are clamped, this being a usual gearing arrangement. On the end of shaft 7 is a shaft extension 12 which projects through a pump casing 13 and drives gear wheels 14 contained therein and which are utilized as the rotating elements of a gear pump for supplying lubricant to the parts of the gearing requiring lubrication. The suction pipe of the gear pump is indicated at 15 and the discharge pipe at 16. Suction pipe 15 connects with a vertical conduit 17 which is connected by a pipe 18 to the bottom of the gear casing. Discharge pipe 16 is connected by conduits indicated generally by the numeral 19 to the various bearings and the spoon oilers 20. Any suitable arrangement may be used for distributing lubricant to the parts requiring lubrication, the arrangement shown being only by way of example. In the gear casing is a quantity of lubricant 21 which is fed to pipe 18 through a strainer 22 and during normal operation the lubricating pump sucks lubricant from the gear casing through pipe 18, vertical conduit 17 and suction pipe 15 and discharges it through discharge pipe 16 and distributing conduits 19.

For priming the lubricating pump I provide a reservoir 23 in the upper portion of the gear casing and at a level above that of the pump and connect it by a conduit 24 and pipe 25 to pipe 18. Reservoir 23 is formed by a wall 26 which extends transversely of the gear casing. It is open at the top and above it cover 11 is provided with walls forming a curved surface 27 for directing lubricant into it. The reservoir 23 and curved surface 27 preferably extend the full width of the gear casing although this is not necessarily required. In pipe 18 in advance of the connection to it of pipe 25 as regards the flow of lubricant is a non-return valve 28 which prevents flow of lubricant from either pipe 18 or 25 back toward the gear casing. Depending from the bottom wall of reservoir 23 is a curved plate 29 which follows the contour of gear wheel 5 and forms a trough or holding means for lubricant carried up by the teeth on gear wheel 5.

In the use of my invention, the gear casing is filled with lubricant to a suitable level as indicated by the line A in Fig. 1, the level being sufficiently high so that gear wheel 5 dips into the lubricant. At this time lubricant will stand in conduits 17 and 25 at this same level A which means of course, that the level in conduit 17 is not such as to prime the lubricant pump. The gearing rotates in the direction indicated by the arrows and as soon as the gearing is started, gear wheel 5 serves to pump lubricant up into reservoir 23 from whence it runs down conduit 25 and up conduit 17 until finally the level reaches the admission opening of the lubricant pump. During this time non-return valve 28 functions to prevent lubricant flowing from conduit 25 back to the gear casing. In performing its pumping function, the teeth on gear wheel 5 carry the lubricant up along trough 29 and discharge it against curved surface 27 which serves to direct it into reservoir 23. As soon as the lubricant reaches the lubricant pump inlet opening, the pump will take hold and begin the distribution of lubricant through conduits 19 to the various parts requiring lubrication. This soon lowers the level of liquid in the gear casing to some level such as that indicated at B which is the normal level when running and as this level is below gear wheel 5, the gear will cease to pump lubricant up to reservoir 23. The level in conduit 25 will then lower to some point below the level B depending upon the suction of the lubricant pump. However, the arrangement is such that the lubricant pump will not draw the level down to a point where the pump can suck air through conduit 25 and lose its priming. In other words, pipes 17 and 25 form a trap to prevent the pump losing its priming after it is started. It will thus be seen that as soon as the gearing is started the lubricant pump will be automatically primed. Conduits 19 are below the level of the bearings, as shown in Fig. 1. With this arrangement, a certain amount of lubricant will remain in these conduits after the initial run in readiness to be forced through the bearings as soon as the pump again starts into operation. This permits the bearings to receive lubricant immediately after the gearing starts, since the distributing conduits will remain practically full after the initial run. The lubricant contained between levels A and B represents the amount of lubricant required to fill the distributing conduits and conduits 17 and 25, and to wet the various surfaces in the gear casing and when the gearing stops running a certain quantity of this lubricant runs back into the bottom of the casing to again raise the level from B a certain distance toward A. If found desirable, the shaft bearings may be lubricated manually when starting up.

With the above described arrangement, the lubricant pump may be located directly in line with and be driven directly by one of the gear wheel shafts. This is of advantage in that it makes a simple structure and enables the lubricant pump to be placed in a position where it is readily accessible for inspection and repair.

In accordance with the provisions of the Patent Statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a gearing, the combination of a casing adapted to hold lubricant in its lower portion, gear wheels journaled in the casing, a pump for supplying lubricant to the parts to be lubricated, a conduit connecting the admission side of the pump with the casing below the lubricant level, and automatic means connected with said conduit for supplying lubricant thereto to prime the pump when starting up.

2. In a gearing, the combination of a casing adapted to hold lubricant in its lower portion, gear wheels journaled in the casing, a pump for supplying lubricant to the parts to be lubricated, said pump being driven directly from one of the gear wheels and located above the normal lubricant level, a conduit connecting the admission side of the pump with the casing below the lubricant level, and means connected with said conduit for automatically supplying lubricant thereto to prime the pump when starting up.

3. In a gearing, the combination of a casing adapted to hold lubricant in its lower portion, gear wheels journaled in the casing, a pump for supplying lubricant from the casing to the parts to be lubricated, and a reservoir to which lubricant is pumped by the gear wheels to prime the lubricant pump when starting up.

4. In a gearing, the combination of a casing adapted to contain lubricant, shafts journaled in walls of the casing, gear wheels on said shafts, a lubricant pump having a casing fastened directly on a side of the gear casing and having a shaft in line with and connected to one of said shafts, conduit means connecting said pump to the gear casing for drawing lubricant therefrom, and means connected with said conduit means for automatically supplying lubricant thereto to prime the pump when starting up.

5. In a gearing, the combination of a casing adapted to contain lubricant, shafts journaled in walls of said casing, gear wheels on said shafts, a lubricant pump driven from one of said shafts and located above the level of the liquid in the casing, a suction conduit connecting the admission side of said pump to the gear casing, a conduit for priming the pump, means for supplying lubricant to said priming conduit when starting up, and means in the suction conduit adjacent the casing for preventing flow of lubricant in said conduit in the direction of the casing.

6. In a gearing, the combination of a casing adapted to contain lubricant, shafts journaled in walls of said casing, gear wheels on said shafts, a lubricant pump driven from one of said shafts and located above the level of the liquid in the casing, a conduit for supplying lubricant to said pump, means for supplying lubricant to said conduit to overcome the difference in level of the pump and lubricant when starting up, and a trap to maintain the difference in level of oil in the casing and in the conduit supplying the pump when starting up.

7. In a gearing, the combination of a casing adapted to hold lubricant in its lower portions, said lubricant having a certain higher level when the gearing is at rest and a certain lower level when the gearing is in operation, gear wheels journaled in the casing, one of said gear wheels being located in the casing in a position to clear the lubricant when the same is at its lower level and to be partly immersed therein when the lubricant is at its higher level, means forming with said gear wheel a lubricant pump having an inlet above the lower level of the lubricant, a second pump for supplying lubricant from the portion of the casing below the lower level therein to parts to be lubricated, said pump being driven directly from one of the gear wheels and located above the higher lubricant level, a reservoir for receiving the discharge from the first-named pump, said reservoir being located above the inlet to the second-named pump, a conduit comprising two substantially vertical sections in series connecting the reservoir with the inlet of the second pump, a conduit providing a connection between the casing below the lower lubricant level and the junction between the vertical conduit sections, said junction being below the bottom of the casing, and a valve means in said last-named conduit for preventing flow therein in the direction of the casing.

8. In a gearing, the combination of a casing adapted to contain lubricant in its lower portions, shafts journaled in the walls of said casing above the lubricant level, gear wheels on said shafts, a lubricant pump driven from one of said shafts and located above the lubricant level in the casing, a pair of conduits extending from below the level of the lubricant in the casing to the level of the admission side of the pump, a suction conduit connecting one of said pair of conduits with the admission side of the pump, means connected with the other of said pair of conduits for automatically supplying lubricant thereto when the gearing is initially started, a conduit joining the lower ends of the pair of conduits with the casing below the lubricant level, and means in the last-named conduit adjacent the casing for preventing flow of lubricant therein in the direction of said casing.

In witness whereof, I have hereunto set my hand this 22nd day of March, 1923.

BERTON A. GARRETT.